(12) United States Patent
Chung et al.

(10) Patent No.: US 9,478,824 B2
(45) Date of Patent: Oct. 25, 2016

(54) FLEXIBLE JELLY-ROLL TYPE SECONDARY BATTERY

(71) Applicant: LG CHEM, LTD., Seoul (KR)

(72) Inventors: Joo-Young Chung, Daejeon (KR); Hyun-Chul Jung, Daejeon (KR); Jae-Bin Chung, Daejeon (KR); In-Gu An, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/194,051

(22) Filed: Feb. 28, 2014

(65) Prior Publication Data

US 2014/0178729 A1 Jun. 26, 2014

Related U.S. Application Data

(63) Continuation of application No. PCT/KR2013/010089, filed on Nov. 7, 2013.

(30) Foreign Application Priority Data

Nov. 8, 2012 (KR) .......................... 10-2012-0126317
Nov. 6, 2013 (KR) .......................... 10-2013-0134438

(51) Int. Cl.
*H01M 4/00* (2006.01)
*H01M 10/04* (2006.01)
(Continued)

(52) U.S. Cl.
CPC ......... *H01M 10/0431* (2013.01); *H01M 2/024* (2013.01); *H01M 2/0207* (2013.01);
(Continued)

(58) Field of Classification Search
CPC ................. H01M 10/0431; H01M 10/0587; H01M 2/0207; H01M 2/0275; H01M 4/0404
See application file for complete search history.

(56) References Cited

U.S. PATENT DOCUMENTS 5,552,931 A 9/1996 Kawamura
5,582,931 A 12/1996 Kawakami
(Continued)

FOREIGN PATENT DOCUMENTS

CN 102082286 A 6/2011
JP 5-288989 A 11/1993
(Continued)

OTHER PUBLICATIONS

Chinese Office Action and Search Report, dated Jun. 20, 2016, for Chinese Application No. 201380002802.X, along with an English translation.
(Continued)

*Primary Examiner* — Jane Rhee
(74) *Attorney, Agent, or Firm* — Birch, Stewart, Kolasch & Birch, LLP (57) ABSTRACT

There is provided a jelly-roll type electrode assembly. In the jelly-roll type electrode assembly including a cathode including a cathode active material coating layer and an anode including an anode active material coating layer, with a separation film interposed therebetween, and formed to be rolled, the jelly-roll type electrode assembly is characterized in that the anode and the cathode include uncoated portions, the uncoated portions are overlapped and include mirror images formed on a front surface and a rear surface, and the jelly-roll type electrode assembly is flexible in the uncoated portion. A pouch-type secondary battery, a battery pack and a device including the electrode assembly are provided. A flexible jelly-roll type secondary battery may be reversibly flexible while blocking the separation of an electrode active material from a current collector surface.

10 Claims, 9 Drawing Sheets

(51) Int. Cl.
    *H01M 2/02*     (2006.01)
    *H01M 10/0587*     (2010.01)
    *H01M 4/13*     (2010.01)
    *H01M 4/02*     (2006.01)
    *H01M 4/04*     (2006.01)

(52) U.S. Cl.
    CPC ......... *H01M 4/13* (2013.01); *H01M 10/0587* (2013.01); *H01M 2/0275* (2013.01); *H01M 4/0404* (2013.01); *H01M 2004/021* (2013.01); *H01M 2004/025* (2013.01)

(56) References Cited

U.S. PATENT DOCUMENTS

| | | |
|---|---|---|
| 6,284,404 B1 | 9/2001 | Horie et al. |
| 6,679,926 B1 | 1/2004 | Kajiura et al. |
| 2006/0008701 A1 | 1/2006 | Kim |
| 2006/0093922 A1 | 5/2006 | Kim et al. |
| 2006/0210874 A1 | 9/2006 | Erhardt et al. |
| 2007/0154795 A1 | 7/2007 | Kim et al. |
| 2010/0310924 A1 | 12/2010 | Kaneda et al. |
| 2010/0330427 A1 | 12/2010 | Kogetsu et al. |
| 2011/0129701 A1* | 6/2011 | Seo ................... H01M 2/263 429/7 |
| 2011/0293977 A1 | 12/2011 | Kim et al. |
| 2012/0058387 A1 | 3/2012 | Ahn |

FOREIGN PATENT DOCUMENTS

| | | |
|---|---|---|
| JP | 10-270068 A | 10/1998 |
| JP | 2000-58103 A | 2/2000 |
| JP | 2001-35484 A | 2/2001 |
| JP | 2002-343340 A | 11/2002 |
| JP | 3397351 B2 | 4/2003 |
| JP | 2006-12813 A | 1/2006 |
| JP | 2006-513574 A | 4/2006 |
| JP | 2007-214086 A | 8/2007 |
| JP | 2008-60130 A | 3/2008 |
| JP | 2010-192462 A | 9/2010 |
| JP | 2012-513088 A | 6/2012 |
| KR | 10-2000-0075254 A | 12/2000 |
| KR | 10-2001-0082127 A | 8/2001 |
| KR | 10-2005-0113860 A | 12/2005 |
| KR | 10-2012-0022385 A | 3/2012 |
| WO | WO 2010/041399 A1 | 4/2010 |

OTHER PUBLICATIONS

Extended European Search Report, dated Jun. 7, 2016, for European Application No. 13817843.9.

* cited by examiner

FLEXIBLE JELLY-ROLL TYPE SECONDARY BATTERY

CROSS REFERENCE TO RELATED APPLICATIONS

This application is a Continuation of PCT International Application No. PCT/2013/010089 filed on Nov. 7, 2013, which claims priority under 35 U.S.C. §119(a) to Korean Patent Application Nos. 10-2012-0126317 filed on Nov. 8, 2012 and 10-2013-0134438 filed on Nov. 6, 2013, in the Korean Intellectual Property Office, the disclosure of which is expressly incorporated herein by reference.

BACKGROUND OF THE INVENTION

1. Field of the Invention

Aspects of embodiments relate to a flexible jelly-roll type secondary battery.

2. Description of the Related Art

Unlike non-rechargeable primary batteries, secondary batteries are chargeable and dischargeable batteries. The range of use thereof is very wide, from small sized portable electronic devices to large scale electrical and electronic apparatuses such as hybrid vehicles or the like.

Secondary batteries are configured by allowing electrode assemblies, having separation films as insulators provided therein and interposed between anodes and cathodes, to be embedded in cases, and installing cap assemblies having external terminals provided therewith in the cases. The anodes and the cathodes are formed of coated portions formed by coating current collectors with an active material and uncoated portions. The uncoated portions of the anodes and the cathodes include electrode taps collecting a current generated in the anodes and the cathodes, respectively, and the electrode taps are attached to electrode assemblies through welding or the like to induce the current generated in the anodes and the cathodes to anode terminals and cathode terminals.

In recent years, as device design has become a significant factor in consumers' choice of products, various types of batteries have been required to accommodate various designs aiming for ergonomic design. In particular, requirements for batteries having a curved shape, able to be stably mounted in devices having a design in which outer surfaces thereof are curved to reduce unnecessary space consumption, have increased.

However, when portions coated with an active material are curved, problems in which the portions are irreversibly transformed and short circuits in electrodes occur due to the separation of an electrode active material from current collector surfaces may occur such that stability of batteries may be deteriorated.

SUMMARY OF THE INVENTION

An aspect of an embodiment may provide a flexible jelly-roll type secondary battery reversibly flexible while preventing an electrode active material from being separated from a current collector surface.

According to an aspect of an embodiment, in a jelly-roll type electrode assembly including a cathode including a cathode active material coating layer formed by coating both surfaces of a cathode current collector with a cathode active material, and an electrode tap; an anode including an anode active material coating layer formed by coating both surfaces of an anode current collector with an anode active material, and an electrode tap; and a separation film interposed between the anode and the cathode, the jelly-roll type electrode assembly being formed to be rolled, the jelly-roll type electrode assembly may be characterized in that the anode and the cathode include uncoated portions not coated with a cathode active material and an anode active material, the uncoated portions are overlapped with each other on the respective cathodes and anodes and include mirror images formed on a front surface and a rear surface thereof based on a jelly-roll formed central surface, and the jelly-roll type electrode assembly is flexible in the uncoated portion.

The cathode and the anode may include one or a plurality of the uncoated portions formed to be parallel to a rolling direction thereof.

The cathode and the anode may include one or a plurality of the uncoated portions formed to be perpendicular to the rolling direction thereof.

The uncoated portion may have at least one selected from a group consisting of a circle, an ellipse, a diagonal shape, letters, an arc shape, and a patterned shape.

The uncoated portion may have an area of 1% to 95% with respect to the overall area of an electrode.

The electrode tap may be formed in regions n which the cathode active material coating layer and the anode active material coating layer are formed.

The electrode tap may be formed in the uncoated portion.

According to an aspect of the inventive concept, a pouch-type secondary battery may include the jelly-roll type electrode assembly described above, a pouch-type exterior material including the jelly-roll type electrode assembly accommodated therein, and an electrolyte injected into the pouch-type exterior material.

According to an aspect of an embodiment, a battery pack may include two or more of the pouch-type secondary batteries described above.

According to an aspect of an embodiment, a device may include at least one of the pouch-type secondary battery described above.

The device may be a mobile phone, a portable computer, a smartphone, a smartpad, a netbook computer, a light electric vehicle (LEV), an electric vehicle, a hybrid electric vehicle, a plug-in hybrid electric vehicle, or a power storage device.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION OF THE PREFERRED EMBODIMENT

Hereinafter, embodiments will be described in detail with reference to the accompanying drawings.

Embodiments may, however, be embodied in many different forms and should not be construed as being limited to embodiments set forth herein. Rather, these embodiments are provided so that this disclosure will be thorough and complete, and will fully convey the scope of the inventive concept to those skilled in the art. In the drawings, the shapes and dimensions of elements may be exaggerated for clarity.

A reversibly flexible jelly-roll type secondary battery according to an embodiment may be provided. In general, a jelly-roll type secondary battery may be formed by stacking a cathode and an anode on one another with a separation film interposed therebetween, to be rolled to have a jelly roll form. The cathode and the anode may include an uncoated portion 11 not coated with an active material. The battery may be flexible in the uncoated portion 11 such that a jelly-roll type secondary battery which is reversibly flexible while blocking the occurrence of short circuits therein may be provided.

According to an embodiment of the inventive concept, a jelly-roll type electrode assembly may include a cathode including a cathode active material coating layer 10*a* formed by coating both surfaces of a cathode current collector with a cathode active material, and an electrode tap 12*a*, an anode including an anode active material coating layer 10*b* formed by coating both surfaces of an anode current collector with an anode active material, and an electrode tap 12*b*, and a separation film 13 interposed between the anode and the cathode, and may be rolled. Here, the anode and the cathode may include uncoated portions 11 not coated with a cathode or anode active material. The uncoated portions 11 may be overlapped with each other on respective cathodes and anodes of the electrode assembly rolled and stacked, may include mirror images formed on a front surface and a rear surface thereof based on a jelly-roll formed central surface. The jelly-roll type electrode assembly may be flexible in the uncoated portion.

In order to obtain a flexible battery according to an embodiment, the cathode active material coating layer 10*a* and the anode active material coating layer 10*b* may be disconnected from each other in portions of the cathode current collector and the anode current collector. For example, by forming the uncoated portions 11 not coated with an electrode active material in portions of respective electrodes, current collectors of respective electrodes may be exposed. Here, the uncoated portions 11 may be formed in regions corresponding to each other in the cathode and the anode.

As described above, by forming the uncoated portions 11 not having the electrode active material coating layers 10*a* and 10*b* on respective electrodes, when a battery is curved, the battery may be flexible in the uncoated portion 11 not coated with an electrode active material, such that the separation of an electrode active material may be fundamentally prevented to block the occurrence of short circuits in a battery. In addition, since the uncoated portions 11 have reversible properties, a flexible battery may be obtained.

The uncoated portions 11 may be formed in a region in which the battery is required to be curved, and two or more of the uncoated portions 11 may be formed. On the other hand, when the uncoated portions 11 are used in a relatively excessive amount, a battery capacity may be reduced, and in order to offset the reduction, an increased amount of assembled batteries may be required to be stacked. Therefore, an area of the uncoated portion 11 may be within a range of 1% to 95% with respect to the overall area of an electrode. When a plurality of the uncoated portions 11 are formed, widths of the uncoated portions 11 may be relatively reduced. The width thereof may be appropriately selected, as needed.

In addition, the uncoated portions 11 may be overlapped with each other on respective cathodes and anodes of the electrode assembly rolled to be stacked. Here, the uncoated portions 11 may have mirror images formed on a front surface and a rear surface thereof based on a jelly-roll formed central surface.

Figure 1:
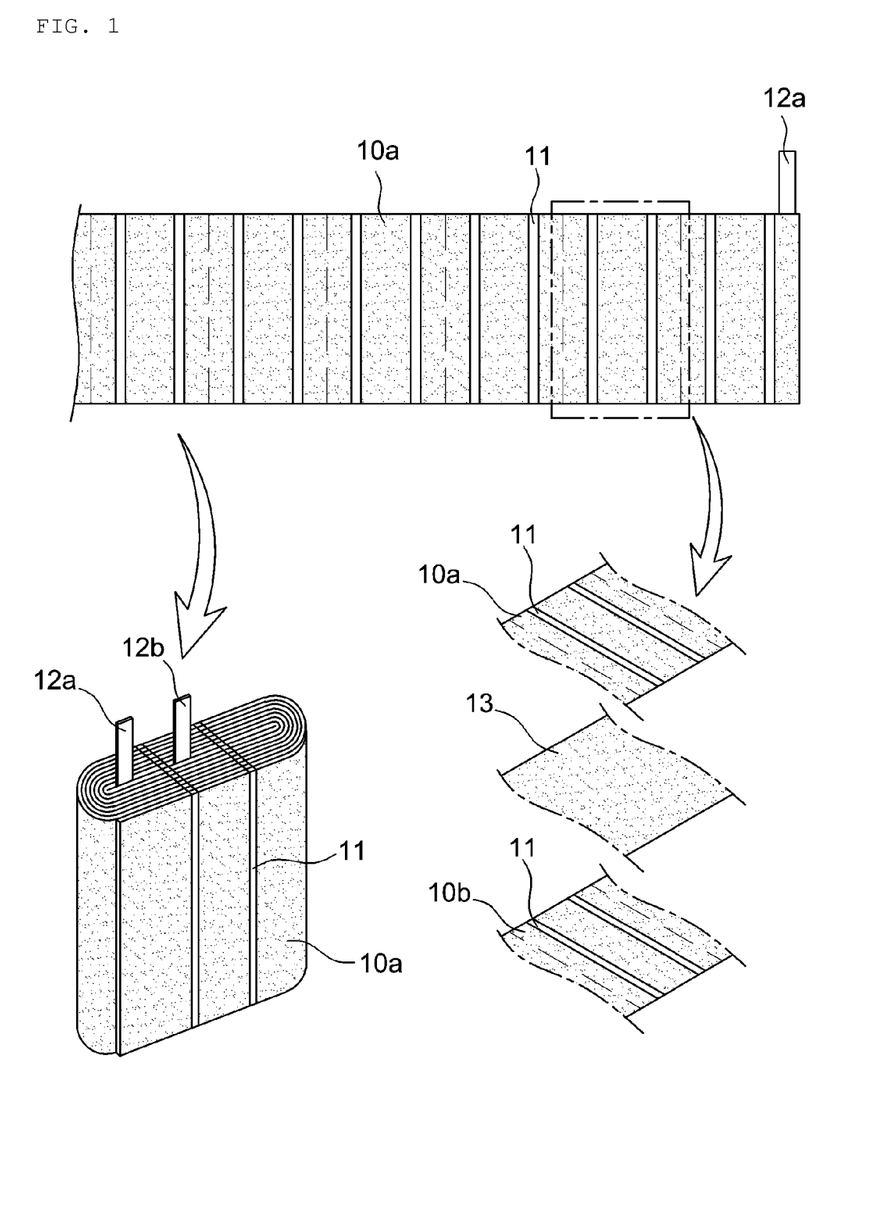
FIG. 1 is a schematic view of a jelly-roll type electrode assembly in which a cathode and an anode include two uncoated portions formed to be perpendicular to a rolling direction thereof.
Figure 2:
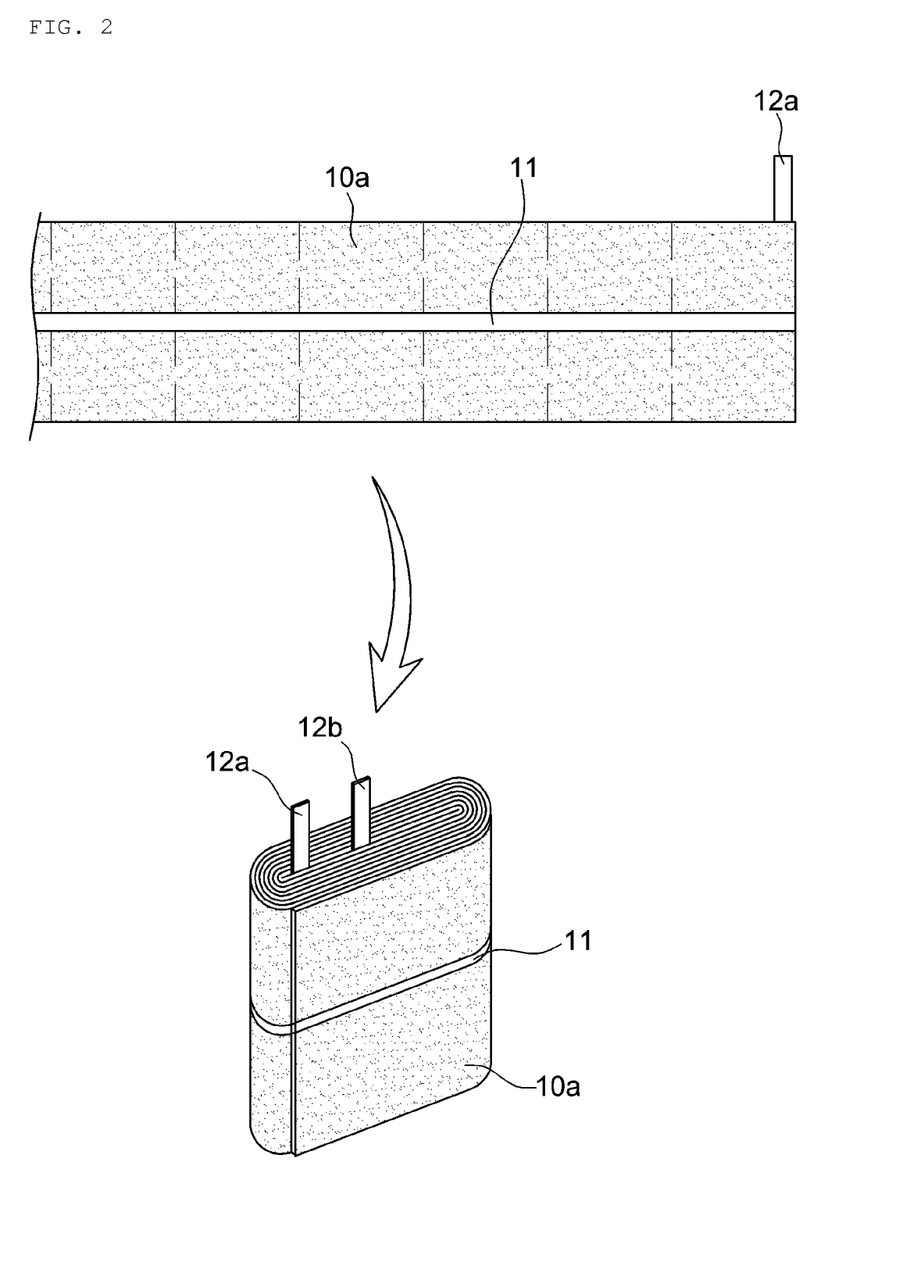
FIG. 2 is a schematic view of a jelly-roll type electrode assembly in which a cathode and an anode include one uncoated portion formed to be parallel to a rolling direction.
Figure 3:
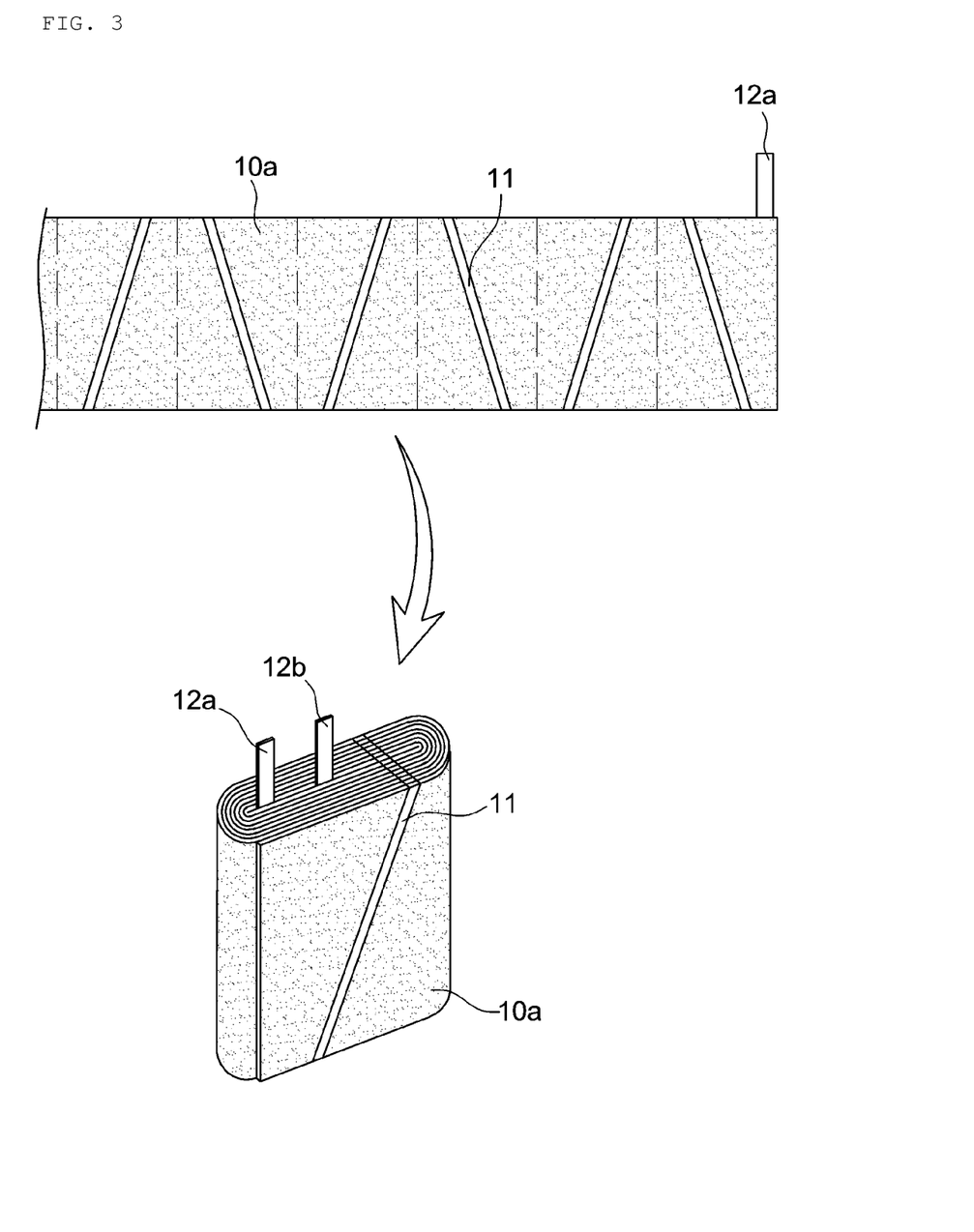
FIG. 3 is a schematic view of a jelly-roll type electrode assembly illustrating a cathode and an anode having a diagonally shaped uncoated portion.
Figure 4:
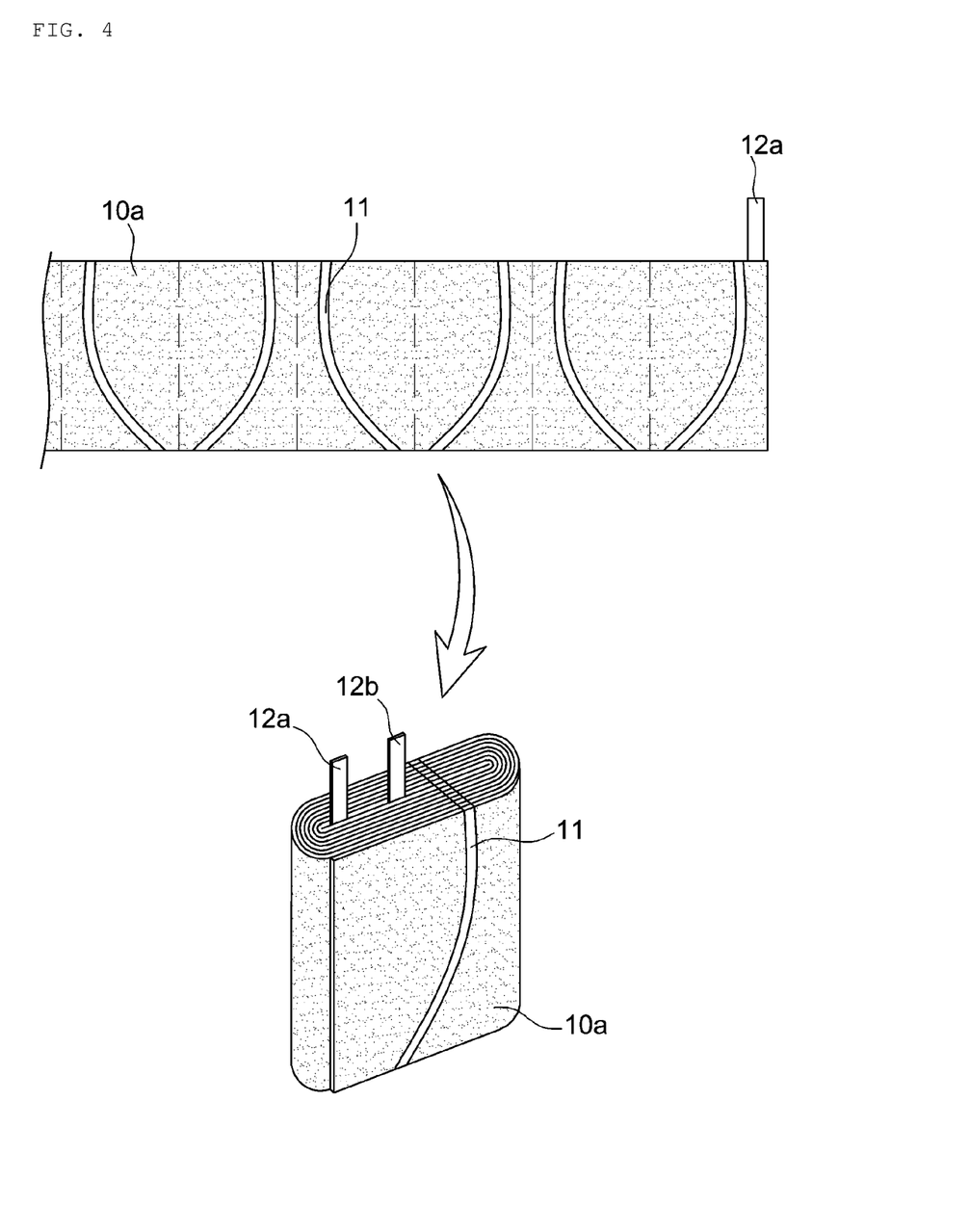
FIG. 4 is a schematic view of a jelly-roll type electrode assembly illustrating a cathode and an anode having an arc-shaped uncoated portion.
Figure 5:
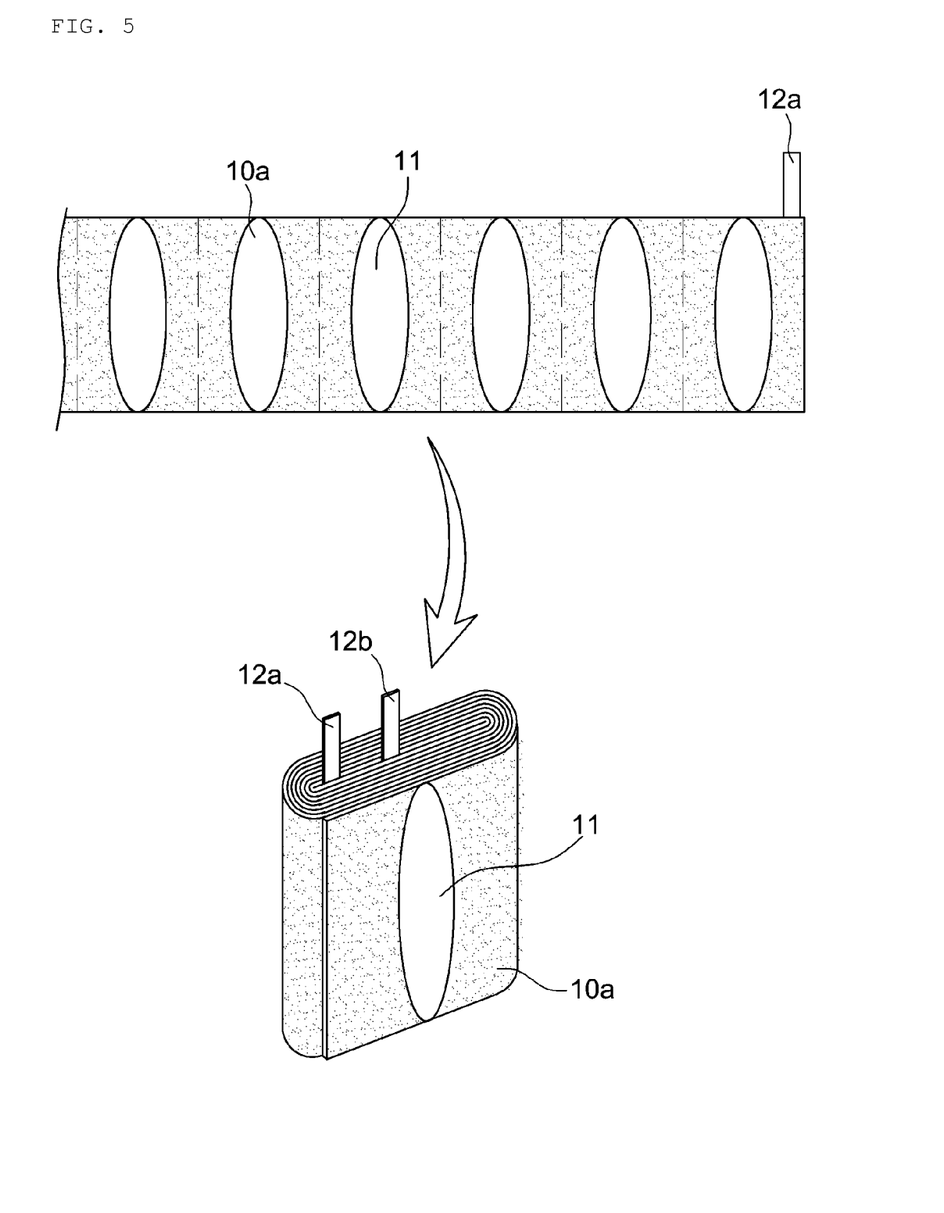
FIG. 5 is a schematic view of a jelly-roll type electrode assembly illustrating a cathode and an anode having an elliptical shape.
Figure 6:
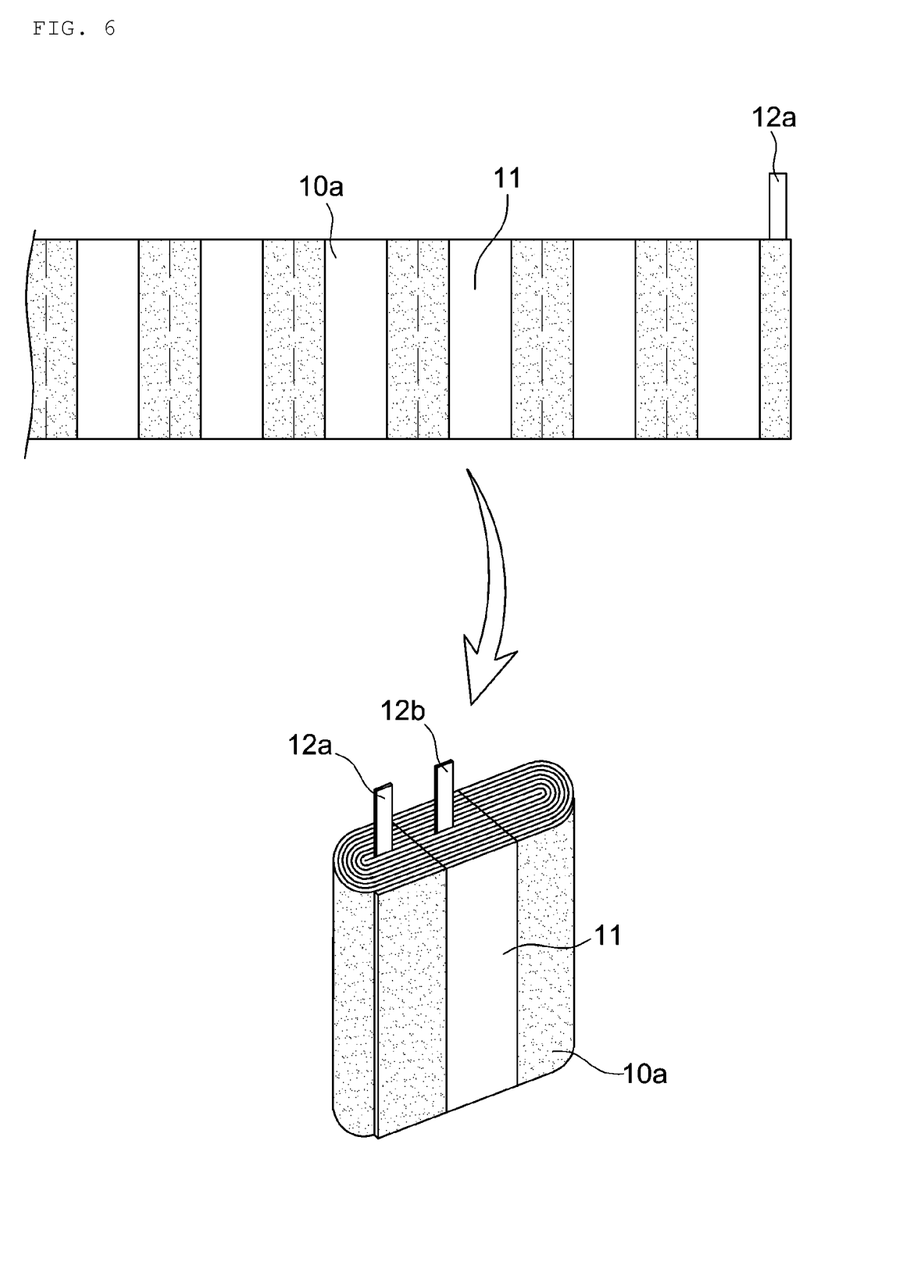
FIG. 6 is a schematic view of a jelly-roll type electrode assembly illustrating a cathode and an anode having a quadrangularly shaped uncoated portion.
Figure 7:
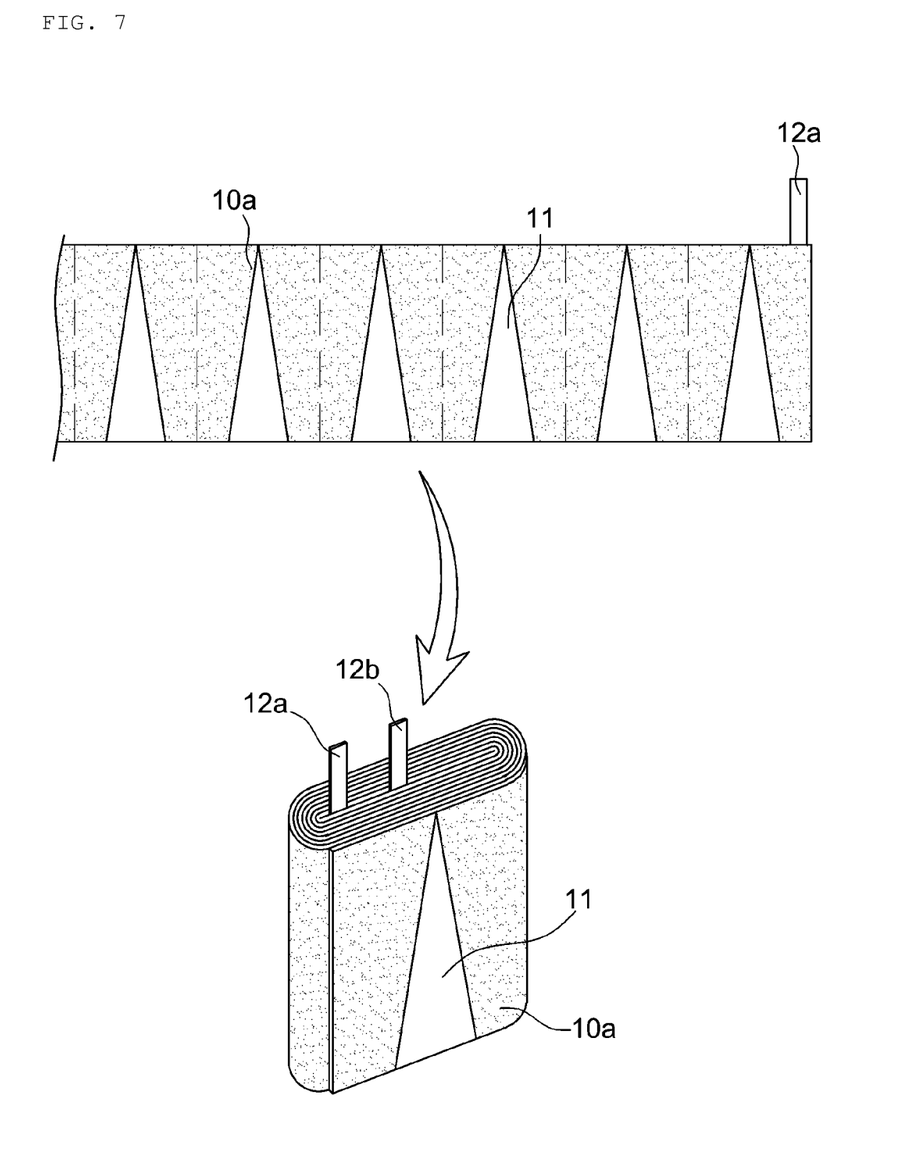
FIG. 7 is a schematic view of a jelly-roll type electrode assembly illustrating a cathode and an anode having a triangularly shaped uncoated portion.
Figure 8:
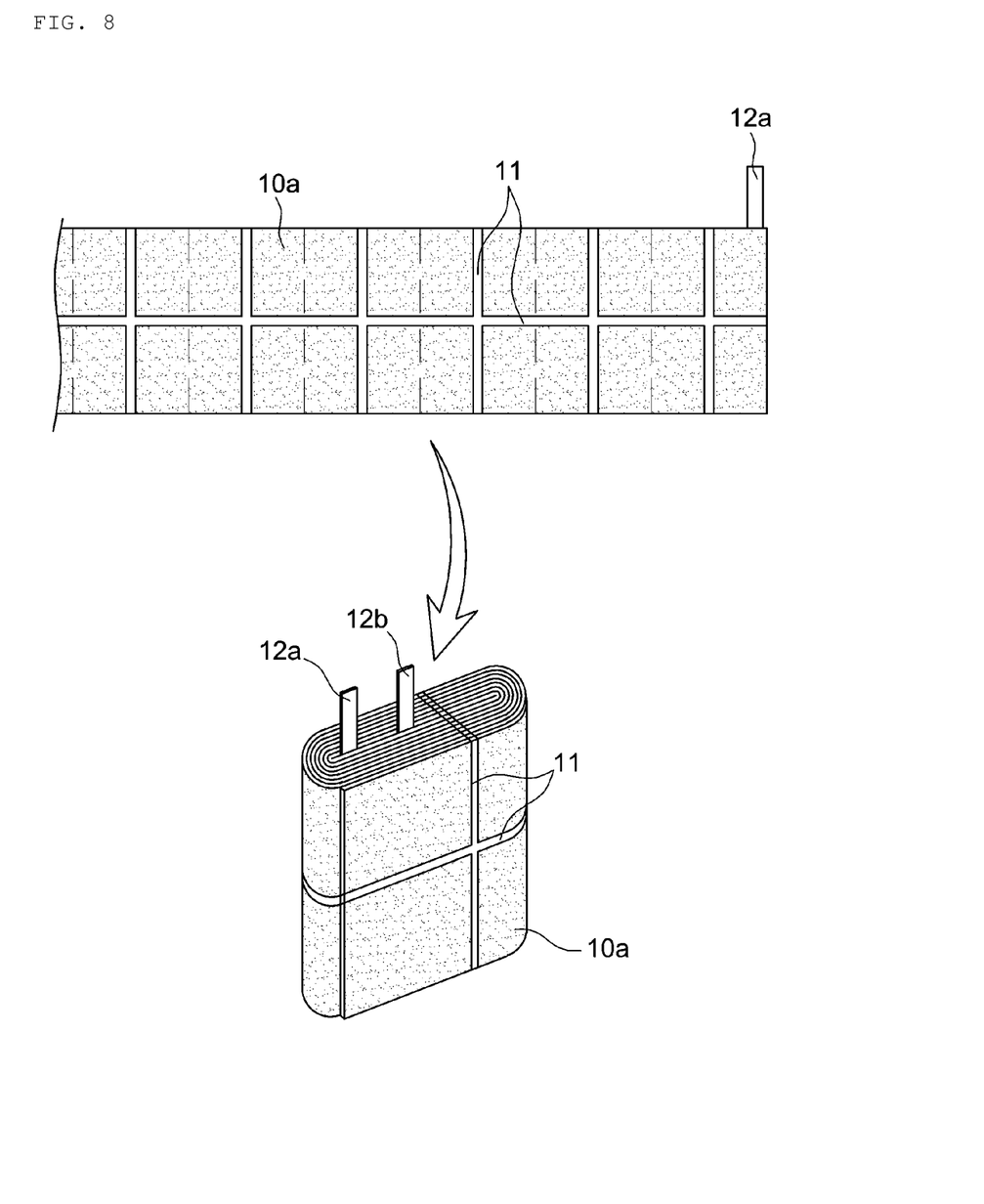
FIG. 8 is a schematic view of a jelly-roll type electrode assembly in which a cathode and an anode include uncoated portions formed to be perpendicular and parallel to a rolling direction.

The uncoated portions 11 may be variously formed such that the battery may be intentionally curved. For example, two uncoated portions 11 may be formed to be perpendicular to a rolling direction as illustrated in FIG. 1, or may also be formed to be parallel to the rolling direction as illustrated in FIG. 2, but should not be considered as being limited thereto. Further, as shown in FIG. 3, the uncoated portions 11 may be formed to be perpendicular and horizontal to a rolling direction thereof. As described above, the uncoated portions 11 may be variously formed without particular limitations.

In addition, as illustrated in FIGS. 4 to 8, in the formed jelly-roll, the uncoated portion 11 may have various shapes such as a quadrangular shape, a triangular shape or an elliptical shape, for example, a polygonal, diagonal or arc shape, or mirrored letters, which are symmetrical, based on a transversal or vertical directional central line on an electrode. In addition, a circle, an ellipse, or other shapes may be formed to be symmetrical based on a point at which transversal and vertical central lines intersect with each other on an electrode.

On the other hand, the cathode and the anode may include electrode taps 12*a* and 12*b*, and in this case, the electrode taps 12*a* and 12*b* may be located in positions in which the cathode active material coating layer 10*a* and the anode active material coating layer 10*b* are formed or may be located on the uncoated portions 11. The electrode taps may be formed in end portions of the respective electrodes in the same manner, and may also be formed in end portions thereof opposed to each other, respectively. For example, a cathode tap 12*a* may be formed in an upper end portion of the electrode and an anode tap 12*b* may be formed in a lower end portion of the electrode, or may be vice versa.

A flexible pouch-type secondary battery may be obtained using a jelly-roll type electrode assembly according to an embodiment of the inventive concept. The pouch-type secondary battery may be formed by accommodating the electrode assembly in a pouch-type exterior material to be airtight and injecting an electrolyte into the pouch-type exterior material to allow the electrode therein to be impregnated with the electrolyte. In addition, a battery pack including two or more of the pouch-type secondary batteries described above may be obtained.

On the other hand, a device including the pouch-type secondary battery may be provided. The device may be a mobile phone, a portable computer, a smartphone, a smartpad, a netbook computer, a light electric vehicle, an electric vehicle, a hybrid electric vehicle, a plug-in hybrid electric vehicle, or a power storage device.

Figure 9:
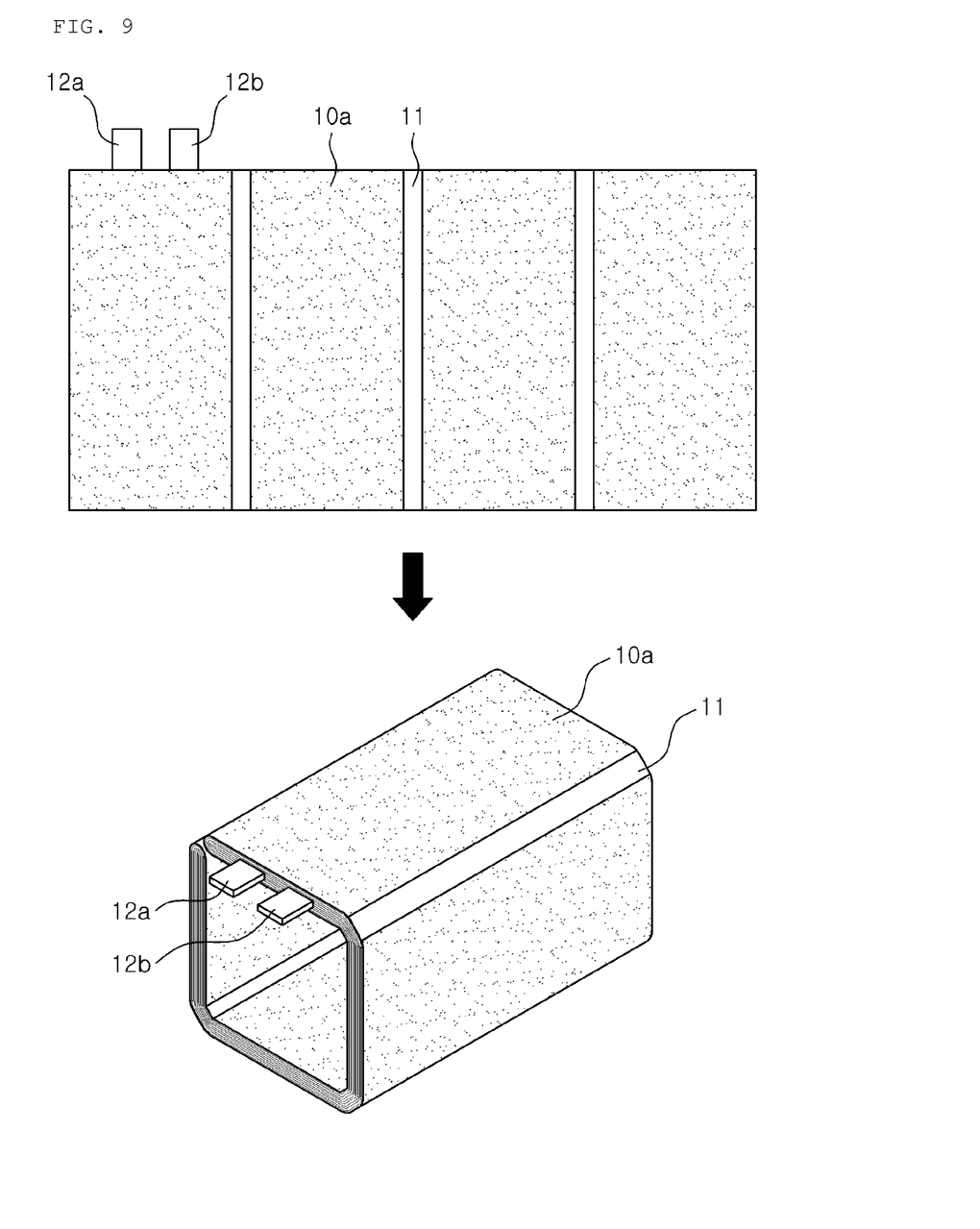
FIG. 9 is a schematic diagram illustrating a manner in which a flexible jelly-roll type secondary battery according to an embodiment is used, wherein in the drawings, 10*a* and 10*b* refer to a cathode active material coating layer and an anode active material coating layer, respectively, 11 refers to an uncoated portion, 12*a* and 12*b* refer to an electrode tap, and 13 refers to a separation film.

Since the jelly-roll type electrode assembly according to an embodiment may be curved or folded to have various forms, various types of secondary battery may be manufactured using the same. Although it is not particular limited, when a flexible secondary battery is manufactured to have a quadrangular pillar form having an internal space as illustrated in FIG. 9, a product may be configured such that a secondary battery is located in an edge portion of an electronic product and a component is located in an inner portion thereof. As such, space may be utilized more variously by using a flexible secondary battery according to an embodiment.

By using a flexible jelly-roll type electrode assembly according to an embodiment, a flexible jelly-roll type secondary battery that is reversibly flexible while blocking the occurrence of a problem such as the separation of an electrode active material from a current collector surface may be provided.

While the inventive concept has been shown and described in connection with the embodiments, it will be apparent to those skilled in the art that modifications and variations can be made without departing from the spirit and scope of the inventive concept as defined by the appended claims.

What is claimed is:

1. A jelly-roll type electrode assembly including a cathode including a cathode active material coating layer formed by coating both surfaces of a cathode current collector with a cathode active material, and an electrode tab; an anode including an anode active material coating layer formed by coating both surfaces of an anode current collector with an anode active material, and an electrode tab; and a separation film interposed between the anode and the cathode, the jelly-roll type electrode assembly being formed to be rolled from a first end of the electrode assembly to the second end of the electrode assembly in a rolling direction, wherein the anode and the cathode include uncoated portions not coated with a cathode active material and an anode active material, the uncoated portions are overlapped with each other on the respective cathodes and anodes and include mirror images formed on a front surface and a rear surface thereof based on a jelly-roll formed central surface, and the jelly-roll type electrode assembly is flexible in the uncoated portion, wherein each of the cathode and the anode includes at least one of the uncoated portions formed to be parallel to the rolling direction and at least one of the uncoated portions formed to be perpendicular to the rolling direction thereof, wherein the uncoated portions are formed so that the cathode active material coating layer and the anode active material coating layer are disconnected from each other in portions of the cathode current collector and the anode current collector in directions both parallel and perpendicular to the rolling direction, and wherein the electrode tab is formed in regions in which the cathode active material coating layer and the anode active material coating layer are formed.

2. The jelly-roll type electrode assembly of claim 1, wherein the uncoated portion has at least one selected from a group consisting of a circle, an ellipse, a diagonal shape, letters, an arc shape, and a patterned shape.

3. The jelly-roll type electrode assembly of claim 1, wherein the uncoated portion has an area of 1% to 95% with respect to the overall area of an electrode.

4. A pouch-type secondary battery comprising:
the jelly-roll type electrode assembly of claim 1;
a pouch-type exterior material including the jelly-roll type electrode assembly accommodated therein; and
an electrolyte injected into the pouch-type exterior material.

5. A battery pack comprising two or more of the pouch-type secondary batteries of claim 4.

6. A device comprising at least one of the pouch-type secondary battery of claim 4.

7. The device of claim 6, wherein the device is a mobile phone, a portable computer, a smartphone, a smartpad, a netbook computer, a light electric vehicle (LEV), an electric vehicle, a hybrid electric vehicle, a plug-in hybrid electric vehicle, or a power storage device.

8. The jelly-roll type electrode assembly of claim 1, wherein the at least one of the uncoated portions extending parallel to the rolling direction is arranged such that the cathode active material coating layer is formed between the at least one of the uncoated portions and opposite, parallel edges of the cathode current collector.

9. The jelly-roll type electrode assembly of claim 1, wherein the at least one of the uncoated portions extending parallel to the rolling direction is arranged such that the anode active material coating layer is formed between the at least one of the uncoated portions and opposite, parallel edges of the anode current collector.

10. The jelly-roll type electrode assembly of claim 1, wherein the at least one of the uncoated portions extending perpendicular to the rolling direction is not located in a bend of the electrode assembly.

* * * * *